United States Patent [19]

Masuda

[11] Patent Number: 5,208,840
[45] Date of Patent: May 4, 1993

[54] METHOD AND ARRANGEMENT FOR DETECTING FRAMING BIT SEQUENCE IN DIGITAL DATA COMMUNICATIONS SYSTEM

[75] Inventor: Kazuaki Masuda, Kanagawa, Japan

[73] Assignee: NEC Corporation, Tokyo, Japan

[21] Appl. No.: 771,466

[22] Filed: Oct. 4, 1991

[30] Foreign Application Priority Data

Oct. 4, 1990 [JP] Japan .................................. 2-267851

[51] Int. Cl.$^5$ .............................................. H04L 7/00
[52] U.S. Cl. ................................... 375/114; 370/105.1
[58] Field of Search ........................ 375/106, 114, 116; 370/100.1, 105.1, 105.4, 106

[56] References Cited

U.S. PATENT DOCUMENTS

| | | | |
|---|---|---|---|
| 4,790,013 | 12/1988 | Kage .................................. | 375/116 |
| 4,984,238 | 1/1991 | Watanabe et al. ................ | 370/105.1 |
| 5,109,393 | 4/1992 | Saegusa ............................ | 375/116 |
| 5,113,417 | 5/1992 | McNesby ........................... | 375/114 |

Primary Examiner—Stephen Chin

[57] ABSTRACT

In order to detect a plurality of framing bit sequences for establishing synchronization at a receiver in a digital communications system, first and second counters are rapidly reset in order to establish the synchronization as early as possible. A comparator receives a bit stream transmitted and a desired bit sequence for use in detecting the framing bit, and compares the desired bit sequence with part of the bit stream and issues a coincidence signal in the event that the desired bit sequence coincides with the part of the bit stream. The first counter is coupled to receive the coincidence signal, and allows an output indicating the establishment of the synchronization to issue in the event that it reaches a predetermined number of correct coincidence signals. The second counter counts up the number of occurrences of the output of a clock counter, and resets itself and the first counter when reaching a predetermine number of occurrences of a pseudo-coincidence signal.

8 Claims, 6 Drawing Sheets

MODULO-5 COUNTER 34(40)

DIFFERENTIATOR 26(28)

METHOD AND ARRANGEMENT FOR DETECTING FRAMING BIT SEQUENCE IN DIGITAL DATA COMMUNICATIONS SYSTEM

BACKGROUND OF THE INVENTION

1. Field of the Invention

The present invention relates generally to a method and arrangement for detecting a framing bit sequence in a digital data communications system, and more specifically to such a method and arrangement by which a plurality of frame bit sequences can be rapidly detected and communication established. The present invention is concerned with a digital communications system wherein a transmitted bit stream is divided into a plurality of frames each of which is identified by a frame bit sequence included therein. Each frame bit sequence precedes data bit stream within the corresponding frame.

2. Description of the Prior Art

A circuit for detecting frame bit sequences is used to establish synchronous condition between a data terminal equipment and a user/network interface interconnected by a two-wire transmission line (for example). The user/network interface is usually attached to an electronic exchange.

Before turning to the present invention it is deemed preferable to discuss a known framing bit sequence detecting arrangement with reference to FIGS. 1 to 4.

Merely for the convenience of description, it is assumed that: (a) each frame consists of 160 bits wherein 4 bits are assigned to a framing bit sequence, (b) the time duration of one frame is 1 ms, (c) the framing bit sequence is followed by data bits (viz. 156 bits) and (c) consecutive frames transmitted are ascertained by frame bit sequences "0000", "0001", "0010", "0011", "0100", . . .

As shown in FIG. 1, a framing bit sequence comparator 10 is provided which has two input terminals 12, 14. The data bit stream 13 transmitted in a manner divided in frames, is received at the input terminal 12, while a framing bit sequence 15 is applied to the input terminal 14 for detecting the framing bit sequence included in the frame transmitted.

In the event that the comparator 10 detects a bit sequence, included a bit stream applied to the input 12, which coincides a framing bit sequence applied to the input 14, the comparator 10 outputs a coincidence signal 16 assuming a high level (for example). The coincidence signal 16 is applied to a set terminal S of an RS flip-flop (FF) 18. In this case, the FF 18 issues a reset signal 20 to a reset terminal R of a clock counter 22. Thus, the counter 22 starts counting clock pulses CK applied to the clock terminal CK thereof via a terminal 24. The clock pulses CK are also applied to a clock terminal CK of each of differentiators 26, 28. Timing charts of the operation of each of the differentiators 26, 28 are shown in FIG. 3. Since the operation of the differentiator 26 (28) is well known in the art, further discussion will be deemed unnecessary.

The clock counter 22 issues a carry signal 30 which assumes a logic 1 at the time when counting up 160 clock pulses the number of which equals the number of bits of one frame.

A modulo-5 counter 34, which follows an AND gate 32, counts up if the signals 16 and 30 applied thereto assume a logic 1 simultaneously. Another AND gate 36 is supplied with the coincidence signal 16 via an invertor 38 at one of the two inputs thereof while receiving the frame count-up signal 30 at the other input. This means that a modulo-5 counter 40 counts up if the carry signal 30 from the counter 22 assumes a logic 1 and simultaneously the coincidence signal 16 assumes a logic 0. The operation of the modulo-5 counter 34 (40) is shown by timing charts in FIG. 2.

In the event that the counter 40 counts up to the maximum number thereof (viz., has counted from 0 to 4 in this particular case), the counter 40 issues a carry signal 42 (logic 1) at an output CA, which is applied to the differentiator 28 and also to a NOR gate 44 via an invertor 46. An output 48 of the differentiator 28 assumes a logic 1 and hence resets the modulo-5 counters 34, 40 via an OR gate 50. Further, the output 42 resets a SR flip-flop 52 in this case.

On the other hand, if the modulo-5 counter 34 counts up from 0 to 4, it issues a carry signal (logic 1) 54 at an output CA, which is applied to the differentiator 26 and also to the NOR gate 44. An output 54 of the differentiator 26 assumes a logic 1 and hence resets the modulo-5 counters 34, 40 via the OR gate 50. Further, the output 54 sets the SR flip-flop (FF) 52, which in turn issues a synchronization detection signal 58 assuming a logic 1 indicating that synchronization has been established.

The operation of the FIG. 1 arrangement will further be described with reference to FIG. 4.

It is assumed that the comparator 10 detects a bit sequence "0000" in the bit stream 13 which coincides with a framing bit sequence 15 assuming "0000" at a time point A. Accordingly, the signal 16 assumes a logic 1. In this instance, the carry signal 30 from the clock counter 22 remains to assume a logic 1 and, hence the state of the counter 34 changes from 0 to 1. However, the counter 40 remains unchanged. Since the content of the framing bit sequence 15 is advanced by one in response to a trailing edge of the carry signal 30, the comparator 10 stores the next framing bit sequence "0001" at a time point B. It is assumed that the comparator 10 detects, at a time point C, a bit sequence "0001" in the bit stream 13 which coincides with the framing bit sequence 15 assuming "0001". In this case, the content of each of the modulo-5 counters 40, 54 remains unchanged. Following this, the carry signal 30 from the clock counter 22 assumes a logic 1 at a time point D and, hence the counter 40 changes the state thereof from 0 to 1 in that the coincidence signal 16 assumes a logic 0 at the time point D.

Similarly, the modulo-5 counter 34 changes the state thereof from 1 to 2 at a time point E, after which it further changes the state thereof from 2 to 3 at a time point H. On the other hand, the modulo-5 counter 40 changes the state thereof from 1 to 2 at a time point F, from 2 to 3 at a time point G, and from 3 to 4 at a time point I. Since the modulo-5 counter 40 counts up to the maximum number 4, the counter 40 issues, at a time point J, the reset signal 42 which renders the counters 34, 40 to reset at a time point slightly later than the time point J. Thus, each of the counters 34, 40 returns to the initial state (viz., 0) as shown in FIG. 4.

In the event that the counter 34 returns to zero, the framing bit sequence 15 again assumes "0000" and advances the content by binary one in response to the trailing edge of the carry signal 30 issued from the clock counter 22. It is assumed that the comparator 10 detects a bit sequence "0000" in the bit stream 13 which coincides with a framing bit sequence 15 assuming "0000" at a time point K. Thus, the signal 16 assumes a logic 1. In this instance, the carry signal 30 from the clock counter 22 assumes a logic 1, so that the state of the counter 34 changes from 0 to 1. However, the counter 40 remains unchanged. Following this, it is assumed that the coincidence signal 16 assumes a logic 1 at time points L, M and N as illustrated in FIG. 4, and the counter 34 counts up from 1 to 4.

At the time point P, which is approximately one clock later from the time point N, a carry signal 54 assuming a logic 1 (denoted by numeral 70) is produced by the modulo-5 counter 34. Accordingly, the synchronization detection signal 58 assumes a logic 1 at the time point P, indicating that a synchronization has been established. After the time point P, the comparator 10 detects bit sequences "0000", "0101", . . . , as shown in FIG. 4. It is a usual practice to transmit meaningless data following each framing bit sequence until the transmitter is informed of the establishment of the synchronization or until a time interval deemed sufficient to establish the synchronization.

However, the above-mentioned prior art has encountered the problem in that it takes an undesirably long time until the reset signal 42 assumes a logic 1 (for example, at the time point J). In more specific terms, it is extremely rare that the modulo-5 counter 34 counts up and allows the FF 52 to issue a logic 1 at an early stage of initially operating the system. Accordingly, it is highly desirable to retry the search for the framing bit sequence by resetting the modulo-5 counters 34, 40. However, there is a high probability that the comparator 10 will detect a bit sequence included in the bit stream 13 which is not located at the appropriate location, viz., the first 4-bit of each of the frames. Therefore, in the event that the same bit sequence erroneously detected at the comparator 10 appears at the same position of the following frames, it takes a long time duration until the counter 40 counts up and resets the modulo-5 counters 34, 40.

SUMMARY OF THE INVENTION

It is an object of the present invention to provide a method of rapidly detecting framing bit sequences for establishing a synchronous condition in a digital data communications system.

Another object of the present invention is to provide an improved arrangement of rapidly detecting framing bit sequences required for establishing a synchronous condition in a digital data communications system.

In brief, the above objects are achieved by a method and arrangement wherein, in order to detect a plurality of framing bit sequences for establishing synchronization at a receiver in a digital communications system, first and second counters are rapidly reset in order to establish the synchronization as early as possible. A comparator receives a bit stream transmitted and a desired bit sequence for use in detecting the framing bit, and compares the desired bit sequence with part of the bit stream and issues a coincidence signal in the event that the desired bit sequence coincides with the part of the bit stream. The first counter is coupled to receive the coincidence signal, and allows an output indicating the establishment of the synchronization to issue in the event that it reaches a predetermined number of correct coincidence signals. The second counter counts up the number of occurrences of the output of a clock counter, and resets itself and the first counter when reaching a predetermine number of occurrences of a pseudo-coincidence signal.

More specifically a first aspect of the present invention is deemed to come in a method of detecting a plurality of framing bit sequences for establishing sychronization at a receiver in a digital communications system wherein a bit stream is transmitted to the receiver in a manner divided into a plurality of frames each of which is identified by a frame bit sequence included therein, the method comprising the steps of: (a) receiving the bit stream and a desired bit sequence whose bit length equals a bit length of the framing bit sequence, comparing the desired bit sequence with part of the bit stream, and issuing a coincidence signal in the event that the desired bit sequence coincides with the part of the bit stream; (b) issuing an output from a clock counter each time the clock counter reaches the number of clocks corresponding to one frame; (c) counting up the number of occurrences of an event that the coincidence signal issues simultaneously with the output of the clock counter at a first counter; (d) counting up the number of occurrences of the output of the clock counter at a second counter; (e) resetting the clock counter and allowing the first and second counters to be reset, in the event that the second counter reaches a predetermined number; and (f) issuing an output which indicates the establishment of the synchronization, in the event that the first counter reaches a predetermined number.

A second aspect of the present invention is deemed to come in a method of detecting a plurality of framing bit sequences for establishing synchronization at a receiver in a digital communications system wherein a bit stream is transmitted to the receiver in a manner divided into a plurality of frames each of which is identified by a frame bit sequence included therein, the method comprising the steps of: (a) receiving the bit stream and a desired bit sequence whose bit length equals a bit length of the framing bit sequence, comparing the desired bit sequence with part of the bit stream, and issuing a coincidence signal in the event that the desired bit sequence coincides with the part of the bit stream and an enable signal is applied; (b) issuing an output from a clock counter each time the clock counter reaches the number of clocks corresponding to one frame; (c) counting up the number of occurrences of the coincidence signal; (d) counting up the number of occurrences of the output of the clock counter at a second counter; (e) resetting the clock counter and allowing the first and second counters to be reset, in the event that the second counter reaches a predetermined number; and (f) issuing an output which indicates the establishment of the sychronization, in the event that the first counter reaches a predetermined number.

A third aspect of the present invention is deemed to come in an arrangement of detecting a plurality of framing bit sequences for establishing synchronization at a receiver in a digital communications system wherein a bit stream is transmitted to the receiver in a manner divided into a plurality of frames each of which is identified by a frame bit sequence included therein, the arrangement comprising: (a) a comparator for receiving the bit stream and a desired bit sequence whose bit length equals a bit length of the framing bit sequence, the comparator comparing the desired bit sequence with part of the bit stream and issuing a coincidence signal in the event that the desired bit sequence coincides with the part of the bit stream; (b) a clock counter for issuing an output therefrom each time the clock counter reaches the number of clocks corresponding to one frame; (c) a first counter being coupled to count up the number of occurrences of an event that the coincidence signal issues simultaneously with the output of the clock counter; (d) first means being coupled to the output of the comparator and an output of the arrangement, the first means allowing the output of the clock counter to pass therethrough except that the output of the clock counter issued while the output of the arrangement indicates the establishment of the synchronization; (e) a second counter being coupled to count up the number of occurrences of the output of the clock counter; (f) second means being coupled to reset the clock counter and to allow the first and second counters to be reset, in the event that the second counter reaches a predetermined number; and (g) second means being coupled to issue an output which indicates the establishment of the synchronization, in the event that the first counter reaches a predetermined number.

A fourth aspect of the present invention is deemed to come in an arrangement of detecting a plurality of framing bit sequences for establishing synchronization at a receiver in a digital communications system wherein a bit stream is transmitted to the receiver in a manner divided into a plurality of frames each of which is identified by a frame bit sequence included therein, the arrangement comprising: (a) a comparator for receiving the bit stream and a desired bit sequence whose bit length equals a bit length of the framing bit sequence, the comparator comparing the desired bit sequence with part of the bit stream and issuing a coincidence signal in the event that the desired bit sequence coincides with the part of the bit stream and an enable signal is applied to the comparator; (b) a clock counter for issuing an output therefrom each time the clock counter reaches the number of clocks corresponding to one frame; (c) a first counter being coupled to count up the number of occurrences of the coincidence signal: (d) first means being coupled to the output of the comparator and an output of the arrangement, the first means allowing the output of the clock counter to pass therethrough except that the output of the clock counter issued while the output of the arrangement indicates the establishment of the synchronization; (e) a second counter being coupled to count up the number of occurrences of the output of the clock counter; (f) second means being coupled to reset the clock counter and to allow the first and second counter to be reset, in the event that the second counter reaches a predetermined number; and (g) second means being coupled to issue an output which indicates the establishment of the synchronization, in the event that the first counter reaches a predetermined number.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 5:
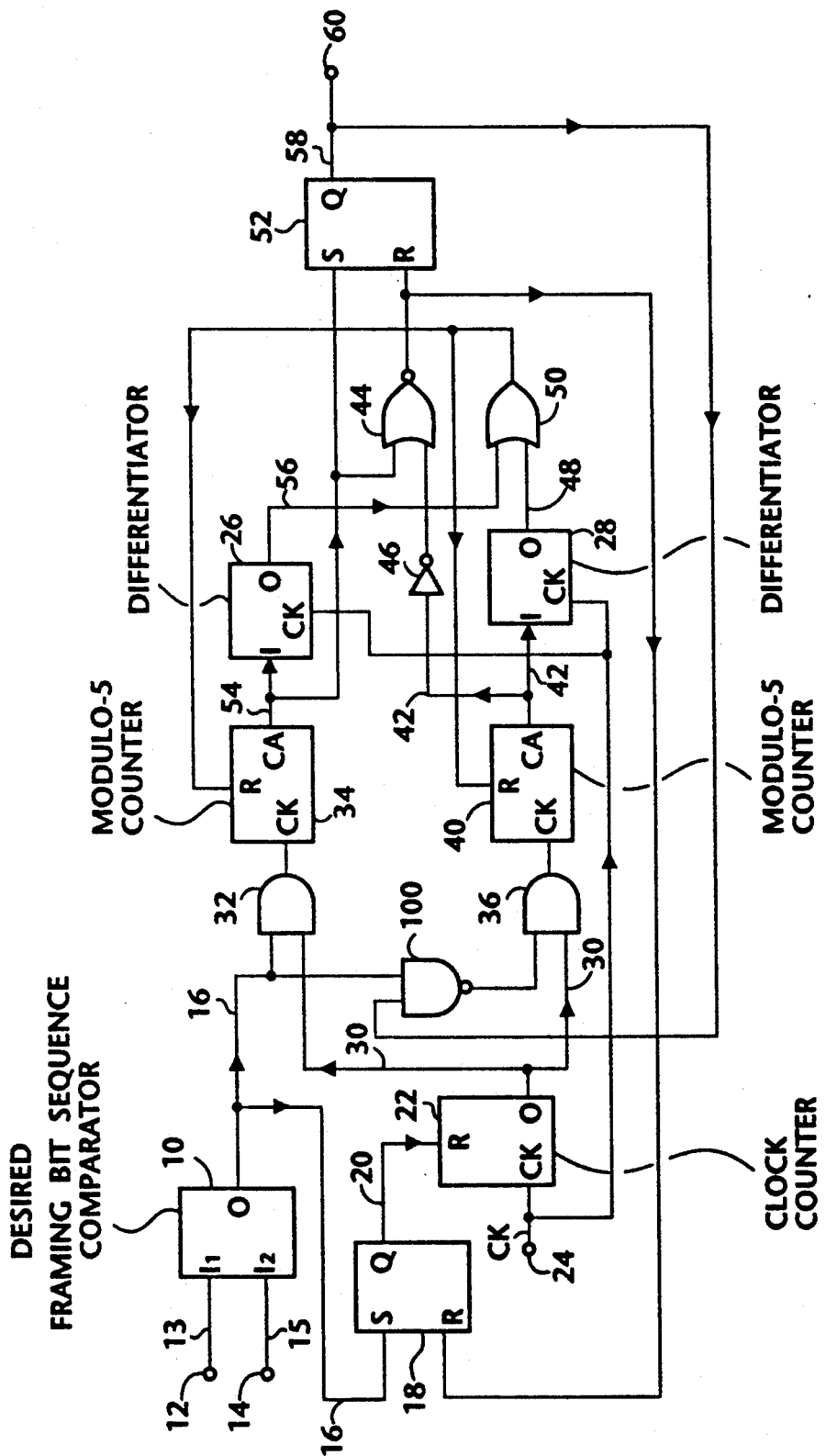
FIG. 5 is a block diagram showing in block diagram form, a first embodiment of the present invention.

Reference is now made to FIG. 5, wherein a first embodiment of the present invention is shown in block diagram form.

Figure 1:
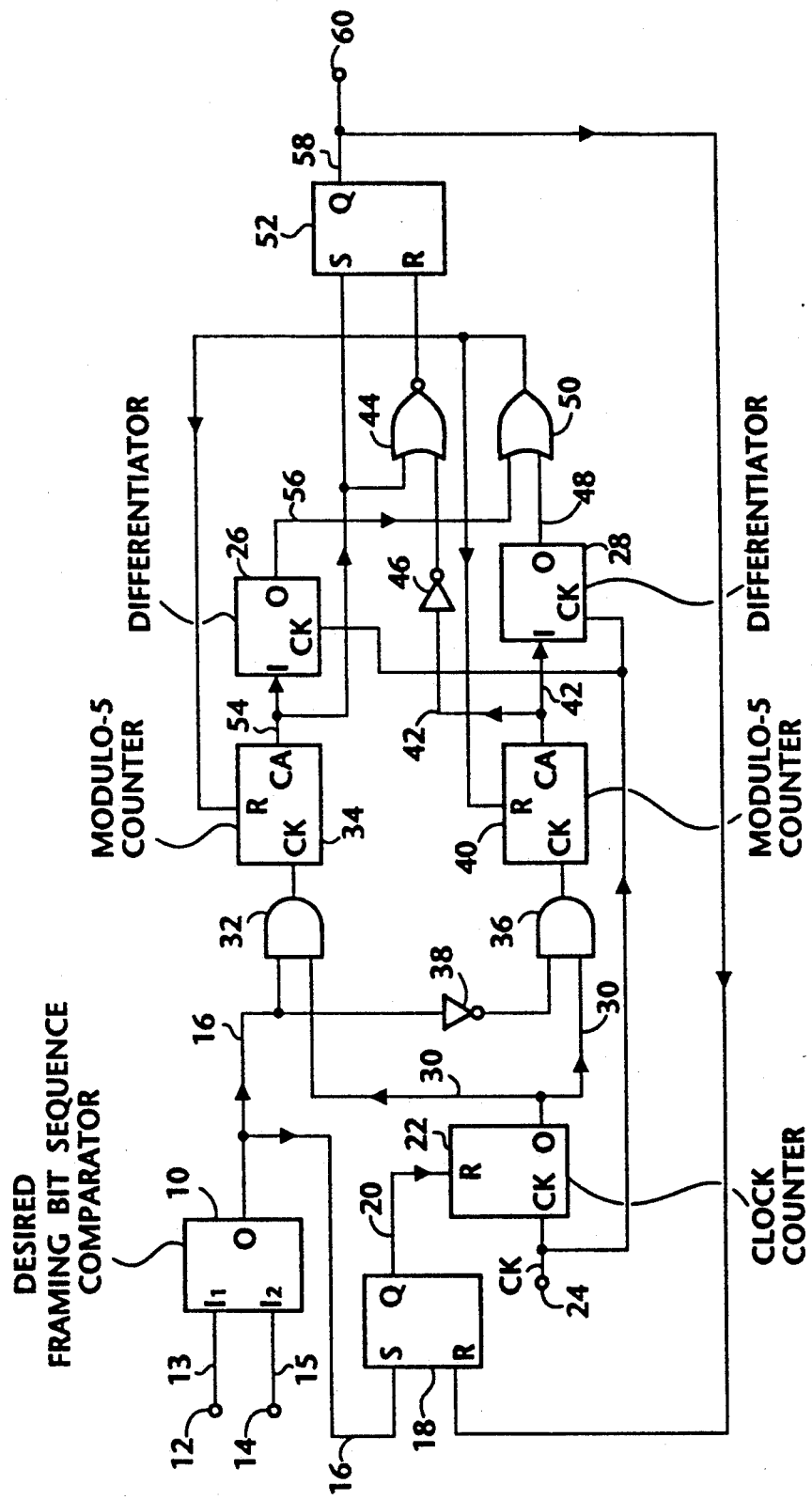
FIG. 1 is a block diagram showing a known arrangement for detecting framing bit sequences referred to in the opening paragraphs of the instant specification.
Figure 2:
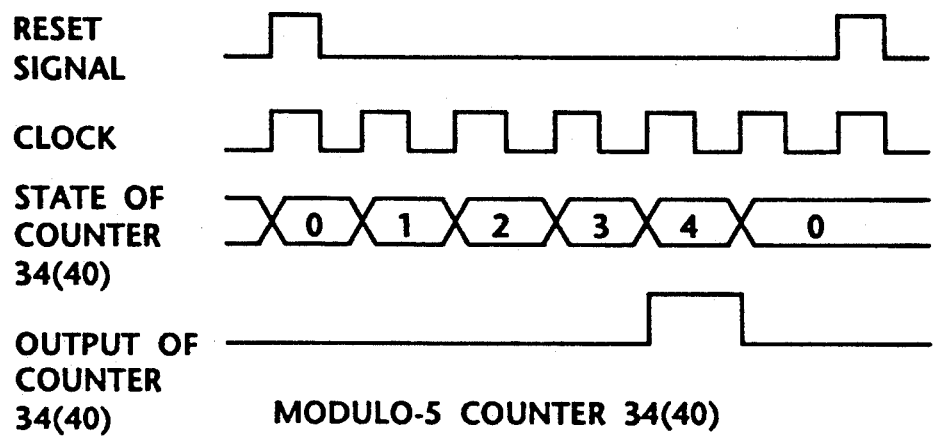
FIGS. 2, 3 and 4 are timing charts which depict the operation of the arrangement shown in FIG. 1.
Figure 3:
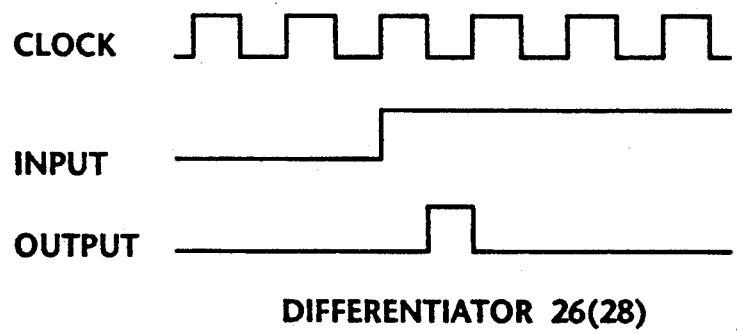
Figure 4:
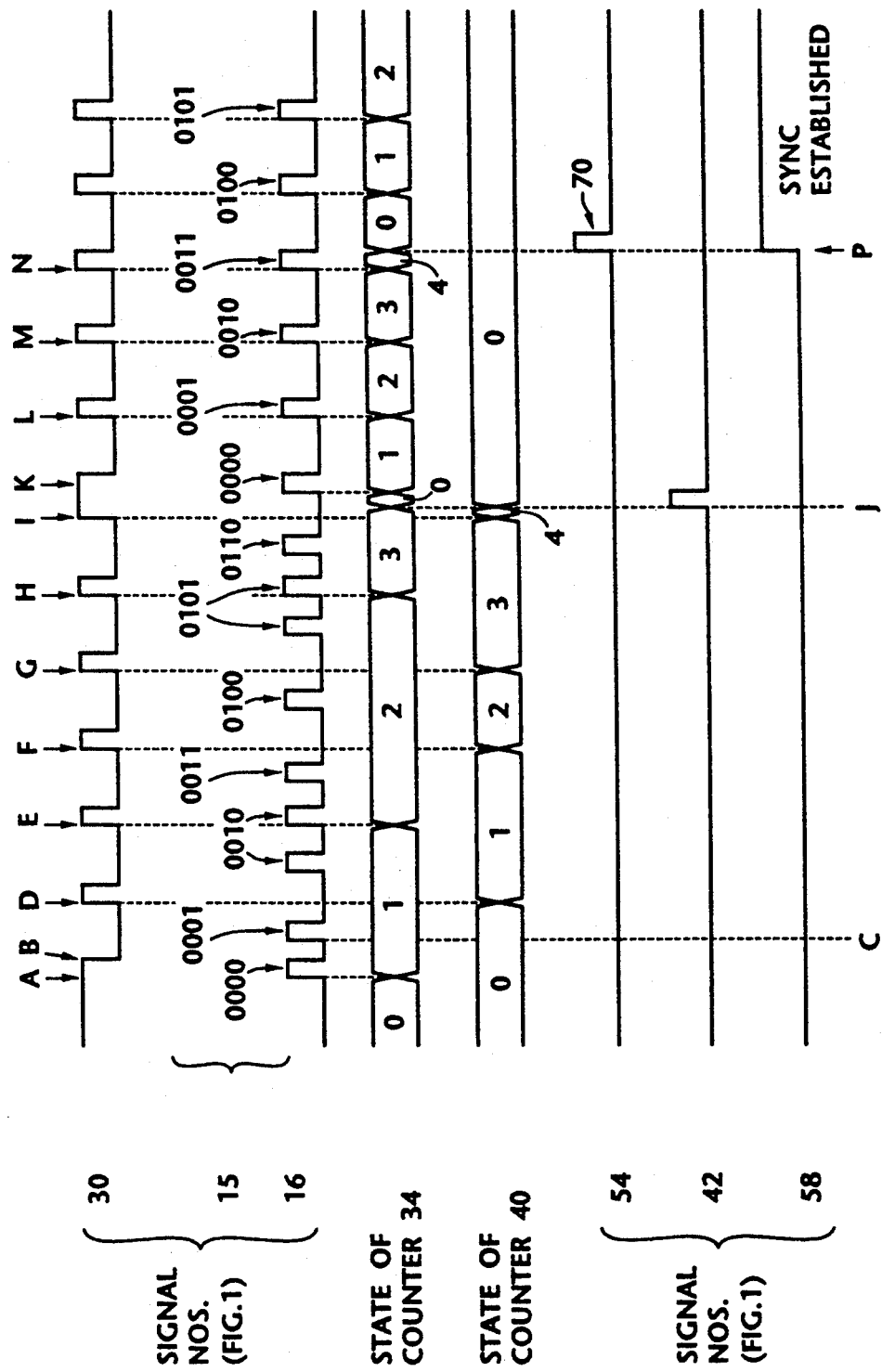

The first embodiment differs from the FIG. 1 prior art in that: (a) the arrangement of the former is provided with a NAND gate 100 in place of the invertor 38 of FIG. 1, (b) the output of the FF 52 is coupled to one of the two inputs of the NAND gate 100 in lieu of the reset terminal R of the FF 18, and (c) the output of the NOR gate 44 is coupled to the reset terminal R of the FF 18. The remaining portions of the FIG. 5 arrangement are the same as those of the FIG. 1 arrangement, and further descriptions will be omitted for the sake of simplicity.

The first embodiment features an arrangement wherein the carry signal 30 of the clock counter 22 does not fail to count up the modulo-5 counter 40. Accordingly, the FF 18 is reset at each time when the counter 40 issues the reset signal 42.

The operation of the first embodiment will further be discussed with reference to the timing chart shown in FIG. 6.

Similar to the case of the above discussed prior art, it is assumed that the comparator 10 detects a bit sequence "0000" in the bit stream 13 which coincides with a framing bit sequence 15 assuming "0000" at a time point A, and that the signal 16 also assumes a logic 1. In this instance, the carry signal 30 from the clock counter 22 continues to assume a logic 1 and, hence the state of the counter 34 changes from 0 to 1. Further, the counter 40 changes the state thereof from 0 to 1. Since the content of the framing bit sequence 15 is advanced by one in response to a trailing edge of the carry signal 30, the comparator 10 stores the next framing bit sequence "0001" at a time point B. It is assumed that the comparator 10 detects, at a time point C, a bit sequence "0001" in the bit stream 13 which coincides with the framing bit sequence 15 assuming "0001". In this case, the content of each of the modulo-5 counters 40, 34 remains unchanged in the same manner as in the case of the above discussed prior art. Following this, the carry signal 30 from the clock counter 22 assumes a logic 1 at a time point D and as a result the counter 40 counts up from 1 to 2 in that each of the coincidence signal 16 and the synchronization detection signal 58 assumes a logic 0 at this time point.

The modulo-5 counter 34 changes its state by counting up from 1 to 2 at a time point E, while the modulo-5 counter 40 counts up from 2 to 3 at the time point E and then from 3 to 4 at a time point F.

As a result of the modulo-5 counter 40 counting up to the maximum number 4, the counter 40 issues, at a time point G, the reset signal 42 renders the counters 34, 40 to reset at a time point slightly later than the time point G. Thus, each of the counters 34, 40 returns to the initial state (viz., 0) as shown in FIG. 6. It should be noted that the counter 34 counts up at each time when the carry signal 30 assumes a logic 1.

In the event that the counter 34 returns to zero, the framing bit sequence 15 again assumes "0000" and advances the content by binary one in response to the trailing edge of the carry signal 30 applied from the clock counter 22. It is assumed that the comparator 10 detects a bit sequence "0000" in the bit stream 13 which coincides with a framing bit sequence 15 assuming "0000" at a time point H. Thus, the signal 16 assumes a logic 1, and hence each of the counters 34, 40 changes the state thereof from 0 to 1. Following this, it is assumed that the coincidence signal 16 assumes a logic 1 at time points J, K and L as shown in FIG. 6, then each of the counters 34, 40 changes from 1 to 4.

At the time point M, which occurs approximately one clock after the time point L, a carry signal 54 assuming a logic 1 (denoted by numeral 102) is produced by the modulo-5 counter 34. Accordingly, the synchronization detection signal 58 assumes a logic 1 at the time point M, indicating that synchronization has been established. After the time point M, the comparator 10 detects bit sequences "0100", "0101", . . . , as shown in FIG. 6. As mentioned above, it is a usual practice to transmit meaningless data following each framing bit sequence until the transmitter is advised of the establishment of the synchronization or until a predetermined time interval deemed sufficient to establish the synchronization, has lapsed.

As understood from the foregoing, the modulo-5 counter 40 counts up, without failure, in response to the occurrence of the carry signal 30 from the clock counter 18. This means that the issuance of the reset pulse 42 is accelerated as compared with the prior art.

Experiments by the inventor have revealed that the time required to establish synchronization can be shortened from about 500 ms to approximately 100 ms, as compared with the FIG. 1 arrangement, under the following exemplary conditions: (a) each frame consists of 160 bits wherein 4 bits are assigned to a framing bit sequence, (b) the time duration of one frame is 1 ms, (c) the framing bit sequence is followed by data bits (viz., 156 bits) and (c) consecutive frames transmitted are ascertained by frame bit sequences "0000", "0001", "0010", "0011", "0100", . . .

Figure 7:
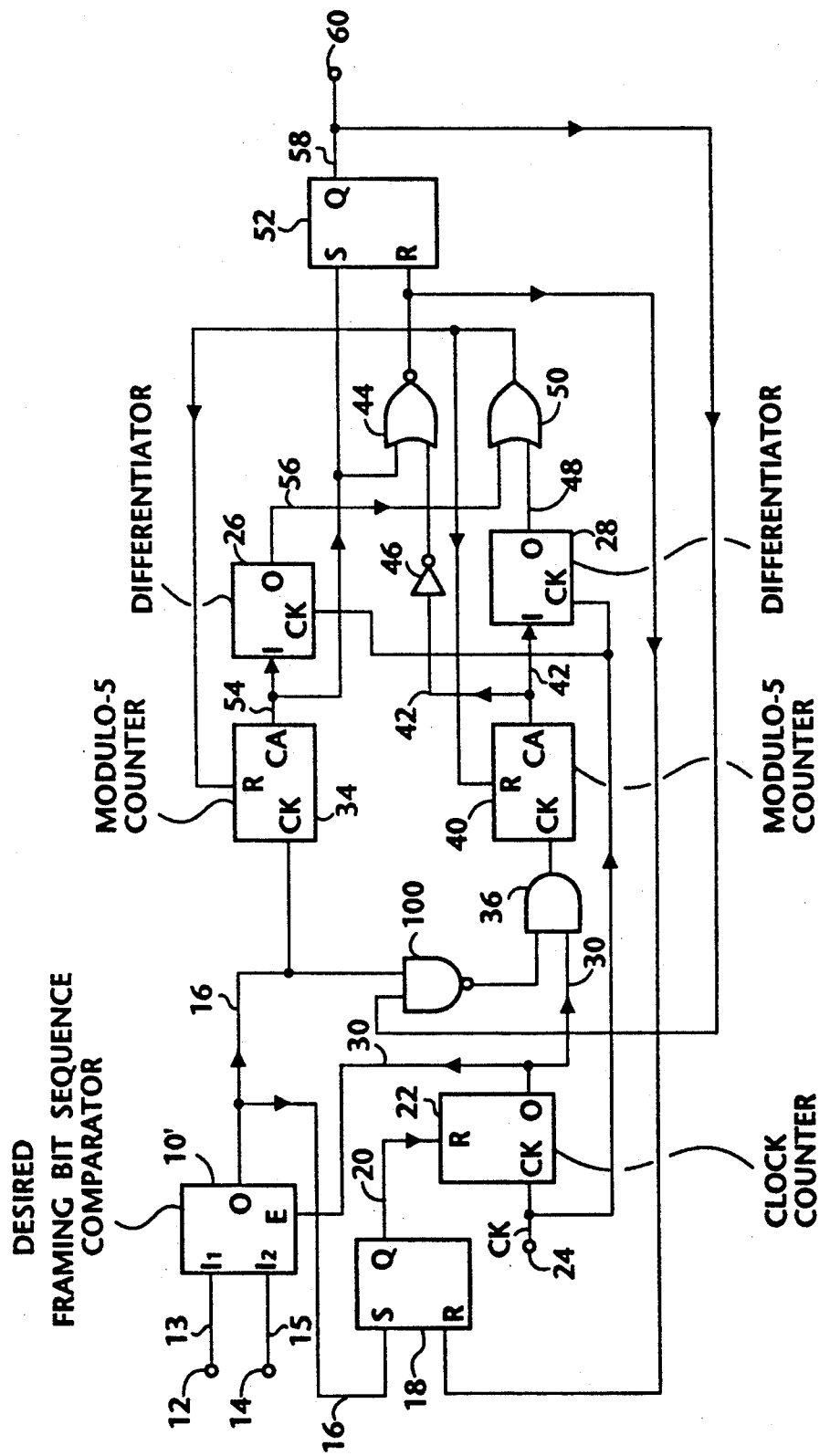
FIG. 7 is a block diagram showing in block diagram form a second embodiment of the present invention.

FIG. 7 is a block diagram showing a second embodiment of the present invention.

Figure 6:
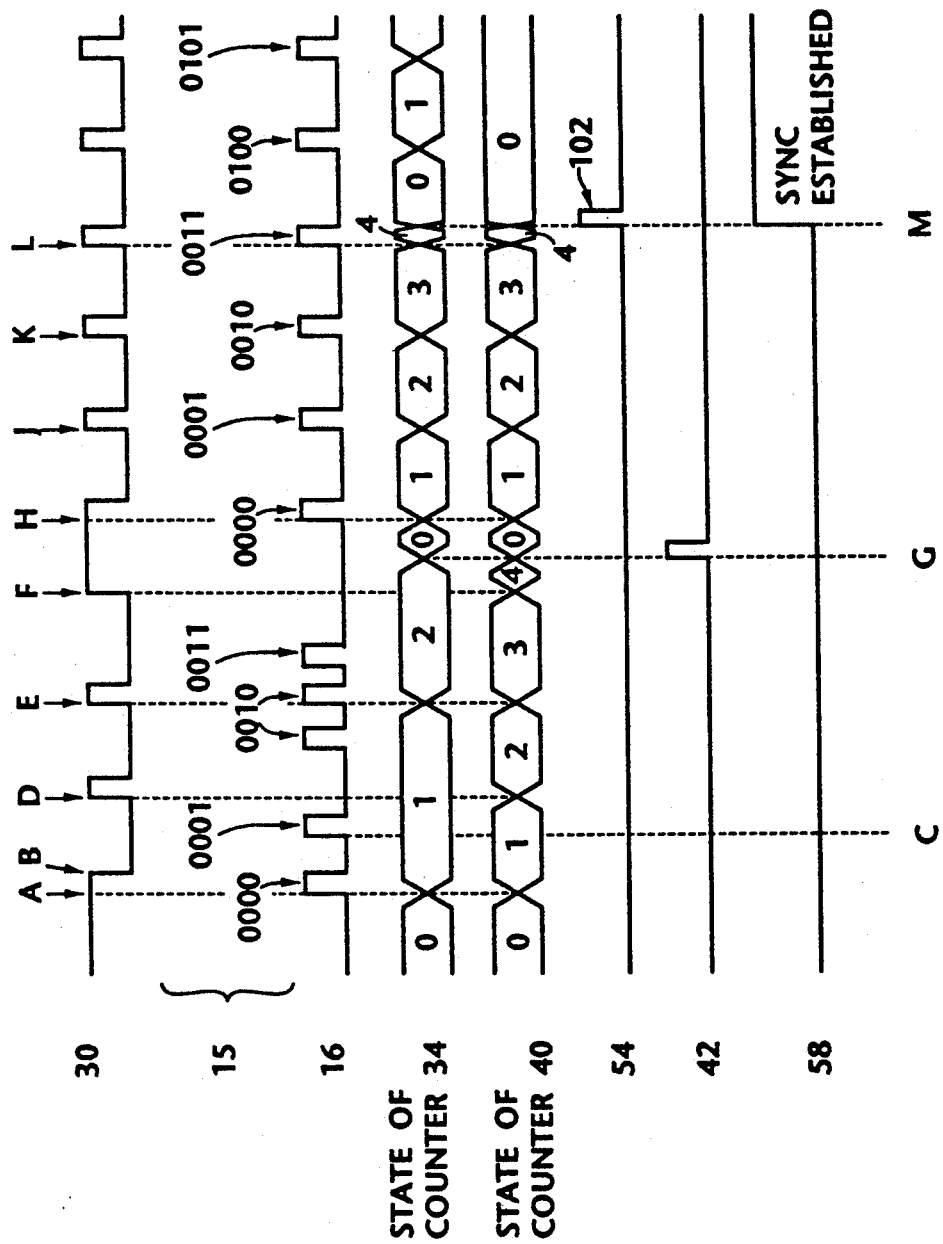
FIG. 6 is a timing chart depicting the operation of the arrangement shown in FIG. 5.

The arrangement of FIG. 7 differs from that of FIG. 6 in that: (a) the AND gate 32 of the latter arrangement is omitted and the coincidence signal 16 is directly applied to the counter 34 and (b) a desired framing bit sequence comparator 10' of the former arrangement is similar to the counterpart 10 of FIG. 1 but modified to accept an enable signal (viz., the carry signal 30) at an enable terminal E.

With this arrangement the comparator 10' is able to output the coincidence signal 16 only when being enabled by the carry signal 30. As clearly seen from FIG. 6, the coincidence signal 16, which is issued in asynchronism with the carry signal 30, is not used to induce either of the counters 34, 40, to count up. Accordingly, it is preferable to prohibit such unnecessary coincidence signals from being issued by the comparator 10'.

In the above embodiments, a modulo-5 counter is used. However, the present invention is by no means limited to such usage.

While the foregoing description describes two embodiments according to the present invention, the various alternatives and modifications possible without departing from the scope of the present invention, which is limited only by the appended claims, will be apparent to those skilled in the art.

What is claimed is:

1. A method of detecting a plurality of framing bit sequences for establishing synchronization at a receiver in a digital communications system wherein a bit stream is transmitted to the receiver in a manner divided into a plurality of frames each of which is identified by a frame bit sequence included therein, the method comprising the steps of:
   (a) receiving the bit stream and a desired bit sequence whose bit length equals a bit length of the framing bit sequence, comparing the desired bit sequence with part of the bit stream, and issuing a coincidence signal in the event that the desired bit sequence coincides with the part of the bit stream;
   (b) issuing an output from a clock counter each time the clock counter reaches the number of clocks corresponding to one frame;
   (c) counting up the number of occurrences of an event that the coincidence signal issues simultaneously with the output of the clock counter at a first counter;
   (d) counting up the number of occurrences of the output of the clock counter at a second counter;
   (e) resetting the clock counter and allowing the first and second counters to be reset, in the event that the second counter reaches a predetermined number; and
   (f) issuing an output which indicates the establishment of the synchronization, in the event that the first counter reaches a predetermined number.

2. A method as claimed in claim 1, wherein the binary value of the bit sequence is changed in response to the occurrence of the output of the clock counter.

3. A method of detecting a plurality of framing bit sequences for establishing synchronization at a receiver in a digital communications system wherein a bit stream is transmitted to the receiver in a manner divided into a plurality of frames each of which is identified by a frame bit sequence included therein, the method comprising the steps of:
   (a) receiving the bit stream and a desired bit sequence whose bit length equals a bit length of the framing bit sequence, comparing the desired bit sequence with part of the bit stream in a comparator, and issuing a coincidence signal when the desired bit sequence coincides with the part of the bit stream and an enable signal is applied to the comparator;
   (b) issuing an output from a clock counter each time the clock counter reaches the number of clocks corresponding to one frame;
   (c) counting up the number of occurrences of the coincidence signal issued by said comparator, at a first counter;
   (d) counting up the number of occurrences of the output of the clock counter at a second counter;
   (e) resetting the clock counter and allowing the first and second counters to be reset, in the event that the second counter reaches a predetermined number; and
   (f) issuing an output which indicates the establishment of the synchronization, in the event that the first counter reaches a predetermined number.

4. A method as claimed in claim 3, wherein the binary value of the bit sequence is changed in response to the occurrence of the output of the clock counter.

5. An arrangement of detecting a plurality of framing bit sequences for establishing synchronization at a receiver in a digital communications system wherein a bit stream is transmitted to the receiver in a manner divided into a plurality of frames each of which is identified by a frame bit sequence included therein, the arrangement comprising:

(a) a comparator for receiving the bit stream and a desired bit sequence whose bit length equals a bit length of the framing bit sequence, the comparator comparing the desired bit sequence with part of the bit stream and issuing a coincidence signal in the event that the desired bit sequence coincides with the part of the bit stream;

(b) a clock counter for issuing an output therefrom each time the clock counter reaches the number of clocks corresponding to one frame;

(c) a first counter being coupled to count up the number of occurrences of an event that the coincidence signal issues simultaneously with the output of the clock counter;

(d) first means being coupled to the output of the comparator and an output of the arrangement, the first means allowing the output of the clock counter to pass therethrough except that the output of the clock counter issued while the output of the arrangement indicates the establishment of the synchronization;

(e) a second counter being coupled to count up the number of occurrences of the output of the clock counter;

(f) second means being coupled to reset the clock counter and to allow the first and second counters to be reset, in the event that the second counter reaches a predetermined number; and (g) second means being coupled to issue an output which indicates the establishment of the synchronization, in the event that the first counter reaches a predetermined number.

6. An arrangement as claimed in claim 5, wherein the first means includes an NAND gate and an AND gate, said NAND gate receiving the coincidence signal and the output of the arrangement, the AND gate receiving the output of the NAND gate and the output of the clock counter.

7. An arrangement of detecting a plurality of framing bit sequences for establishing synchronization at a receiver in a digital communications system wherein a bit stream is transmitted to the receiver in a manner divided into a plurality of frames each of which is identified by a frame bit sequence included therein, the arrangement comprising:

(a) a comparator for receiving the bit stream and a desired bit sequence whose bit length equals a bit length of the framing bit sequence, the comparator comparing the desired bit sequence with part of the bit stream and issuing a coincidence signal in the event that the desired bit sequence coincides with the part of the bit stream and an enable signal is applied to the comparator;

(b) a clock counter for issuing an output therefrom each time the clock counter reaches the number of clocks corresponding to one frame;

(c) a first counter being coupled to count up the number of occurrences of the coincidence signal;

(d) first means being coupled to the output of the comparator and an output of the arrangement, the first means allowing the output of the clock counter to pass therethrough except that the output of the clock counter issued while the output of the arrangement indicates the establishment of the synchronization;

(e) a second counter being coupled to count up the number of occurrences of the output of the clock counter;

(f) second means being coupled to reset the clock counter and to allow the first and second counters to be reset, in the event that the second counter reaches a predetermined number; and (g) second means being coupled to issue an output which indicates the establishment of the synchronization, in the event that the first counter reaches a predetermined number.

8. An arrangement as claimed in claim 7, wherein the first means includes an NAND gate and an AND gate, said NAND gate receiving the coincidence signal and the output of the arrangement, the AND gate receiving the output of the NAND gate and the output of the clock counter.

* * * * *